(12) United States Patent
Pizot et al.

(10) Patent No.: US 8,453,220 B2
(45) Date of Patent: May 28, 2013

(54) DEVICE ASSOCIATION

(75) Inventors: Laurent Pizot, Camas, WA (US); Kulkarni Sudhindra Venkatesh, Bangalore Karnataka (IN); Raviraj Avadhut Kandalgaonkar, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 12/971,693

(22) Filed: Dec. 17, 2010

(65) Prior Publication Data

US 2012/0159584 A1 Jun. 21, 2012

(51) Int. Cl.
*G06F 21/00* (2006.01)

(52) U.S. Cl.
USPC .......................................................... 726/5

(58) Field of Classification Search
USPC ........................................................ 726/5, 18
See application file for complete search history.

(56) References Cited

U.S. PATENT DOCUMENTS

| | | | |
|---|---|---|---|
| 2004/0006705 A1* | 1/2004 | Walker | 713/200 |
| 2007/0086426 A1* | 4/2007 | Bonta et al. | 370/350 |
| 2010/0277528 A1* | 11/2010 | King et al. | 347/10 |

\* cited by examiner

*Primary Examiner* — Brandon Hoffman
*Assistant Examiner* — Anthony Brown
(74) *Attorney, Agent, or Firm* — Robert McDowell

(57) ABSTRACT

Embodiments provide systems, methods, and articles of manufacture for enabling a client to associate with a device. In various embodiments, the device may transmit cryptographic data to a client. Based on and utilizing the cryptographic data, the client may associate with the device.

20 Claims, 6 Drawing Sheets

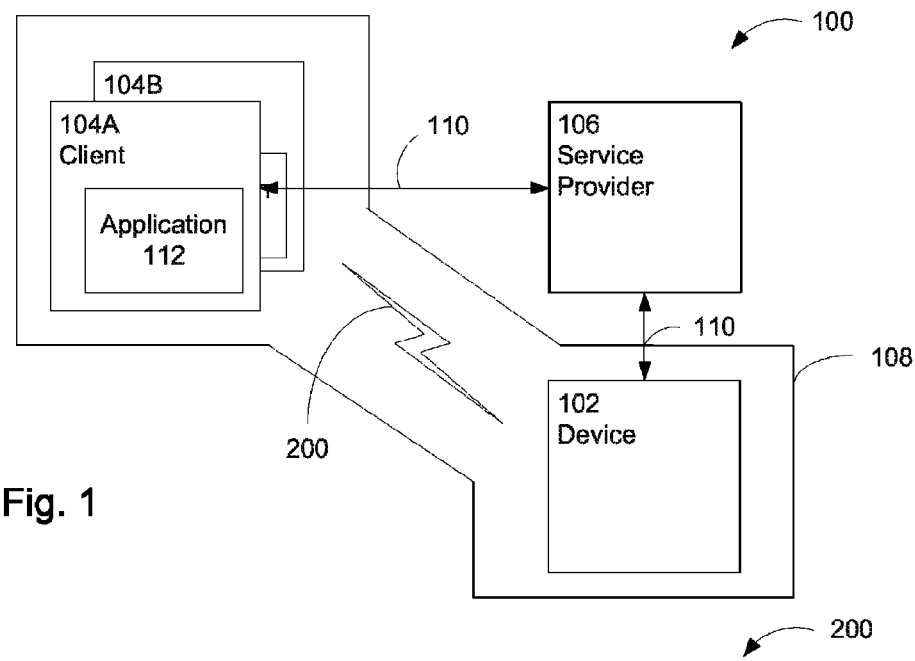
Fig. 1
Fig. 2
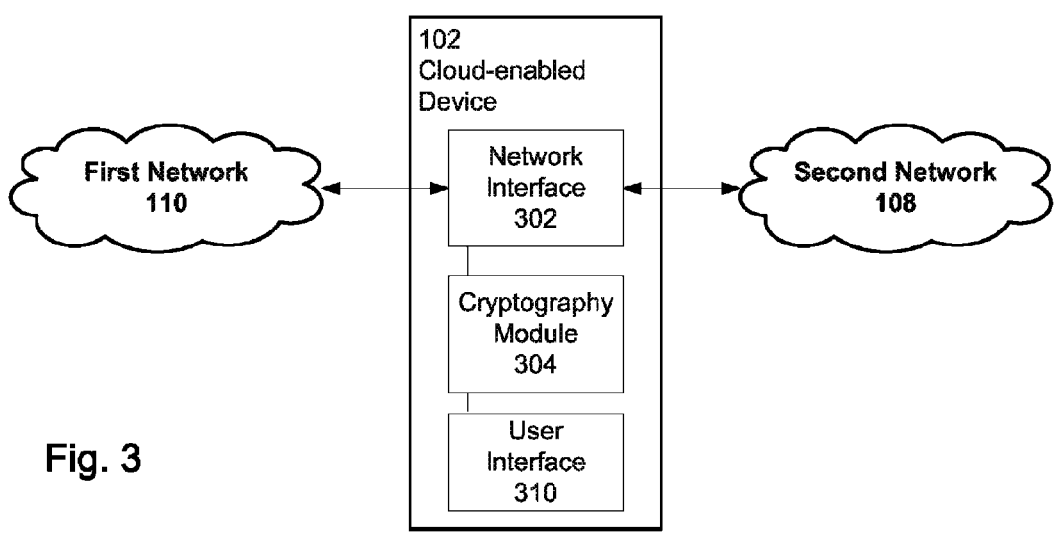
Fig. 3

DEVICE ASSOCIATION

BACKGROUND

Cloud services enable users to interact with cloud-enabled devices over the internet. Typically, the cloud-enabled devices are assigned unique identifiers. These unique identifiers may be utilized to transmit data to the cloud-enabled device. To prevent misuse of the cloud-enabled devices, the identifiers are generally long and random. This may prevent a malicious user from obtaining them, for example, by guessing, but it may also make their entry on authorized devices cumbersome. Manual entry presents further issues when the client devices have limited interface capabilities, for example, entry on various mobile devices.

BRIEF DESCRIPTION OF THE DRAWINGS

FIG. 1 illustrates a block diagram of a computing system in accordance with various embodiments of the present disclosure;

FIG. 2 illustrates an embodiment of beacon data in accordance with the present disclosure;

FIG. 3 illustrates an embodiment of a device in accordance with the present disclosure

DETAILED DESCRIPTION OF DISCLOSED EMBODIMENTS

Figure 4:
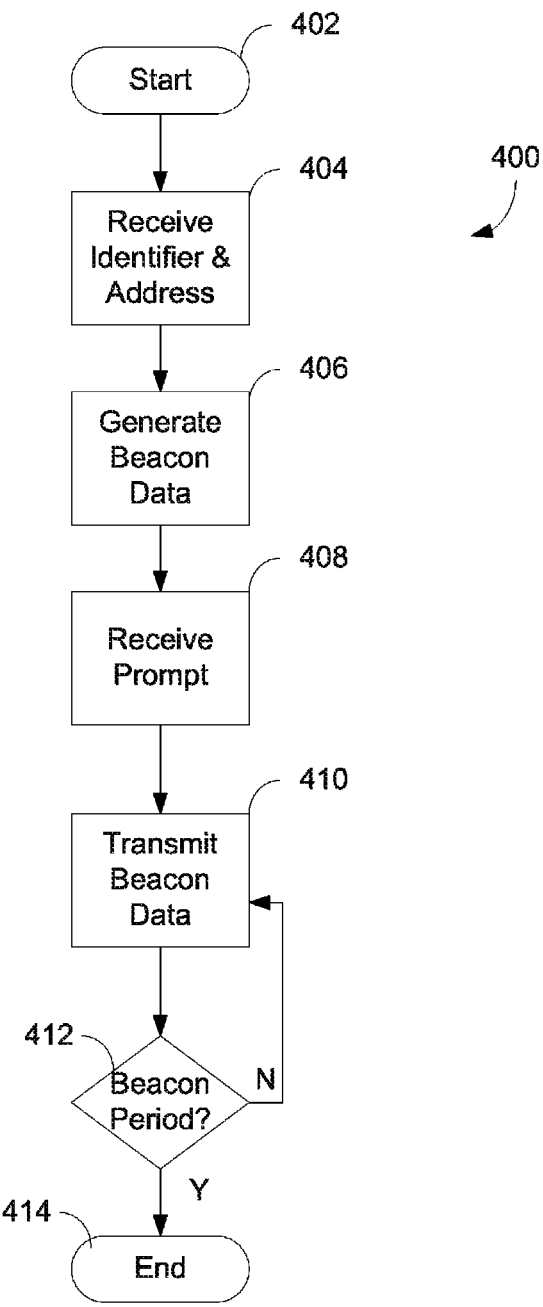
FIGS. 4-7 illustrate flow diagrams in accordance with various embodiments of the present disclosure.

During registration for cloud services, a cloud service provider may assign an identifier and an email address to a device. The identifier and the email address may then be used to identify, locate, and transmit data to the device from anywhere in the world. As an example, during registration with a cloud service provider, a printer will receive a cloud identifier and an email address. The email address may be used to transmit print data to the printer. Because any client having the email address is capable of transmitting print data to the printer, thereby utilizing or wasting printer resources, the assigned email addresses are typically long, random, and confidential.

The security measure of long and random email addresses may prevent unauthorized clients from guessing the email address and transmitting unwanted print data (e.g., spam) to the printer, but they also present challenges for authorized clients. For example, because of the length and randomness of the email addresses, users are likely to encounter errors while manually entering them. Additionally, various clients have limited interface capabilities, for example, mobile phones. This may present further challenges to the entry of an assigned email address.

To enable a client to receive the assigned email address without manual entry presents multiple challenges. The email address may be broadcast over, for example, a local area network, however, these open programmatic interfaces lack security and could enable a user to "harvest" or gather all the email addresses associated with the local area network. Additionally, in the instance where multiple devices are located on the same local area network, the multiple broadcasts of lengthy, random email addresses would present a client with numerous options for association, thus increasing the difficulty in identifying the correct device.

In the present disclosure, articles of manufacture, methods, apparatuses, and systems for securely providing the address of a device to an intended client are provided. The address of the device is cryptographically protected and broadcast over a local area network. Upon receiving the cryptographically protected address, the client may communicate with the assigning cloud service provider to exchange it for the actual address of the device, thereby negating the need for entry of the address.

Referring to FIG. 1, a system 100 is illustrated in accordance with various embodiments. The system 100 includes a device 102, one or more clients 104A-B, and a service provider 106. The service provider 106 communicates with the device 102 and the clients 104A-B via a first network 110. Additionally, the device 102 communicates with the clients 104A-B via a second network 108.

In various embodiments, the device 102 is any device capable of communicating with a service provider 106, such as a cloud service provider. In at least one embodiment, the device 102 is a print device, such as but not limited to, a printer or a multifunction peripheral device, wherein a multifunction peripheral device is a device capable of incorporating one or more functions including, but not limited to, printing, scanning, and faxing. The device 102 may be configured to communicate, in a wireless or wired fashion, with the service provider 106 over a first network 110, for example the internet, and further configured to communicate with one or more clients 104A-B over a second network 108, for example a local area network. The device 102 may utilize one or more protocols for communication over the various networks.

The clients 104A-B may be computing devices capable of communication and association with the device 102. For example, the clients 104A-B may be computing devices such as, but not limited to, desktop computers, notebook computers, netbooks, mobile phones, personal data assistants ("pda"), tablet computers, slate computers, or cameras. Similar to the device 102, the clients 104A-B may have the capability to interface with multiple networks, for example, local area networks and wide area networks. In various embodiments, the clients 104A-B may include an application 112 configured to interact with the device 102 and the service provider 106. The application 112 may comprise a plurality of programming instructions stored on a computer readable medium. The instructions, if executed by the client 104A-B, may result in the client 104A-B performing one or more of the operations described herein.

The service provider 106, in various embodiments, may be a cloud service provider disposed on the internet and having multiple servers and computing devices (not illustrated) to process and provide cloud services. The service provider 106 may be configured to register, assign, and communicate with device 102 and clients 104A-B over network 110. In various embodiments, registration may include assignment of identifiers and addresses to both the device 102 and clients 104A-B.

In an example embodiment, the device 102 is configured to register with the service provider 106 over the internet 110. During registration the device 102 receives an identifier and an address. The device 102 may be further configured to generate beacon data 200 based on the identifier and the address and transmit or broadcast the beacon data 200 over the network 108.

A graphical representation of beacon data 200 is illustrated in FIG. 2, in accordance with various embodiments. The beacon data 200 includes an identifier 202 of the device 102 and a device signature 204 of the device 102. The device signature 204 is a cryptographic element that is generated by the device 102 utilizing the identifier 202 and the address 203 received during the registration process. Consequently, while the beacon data 200 is based on the identifier 202 and the address 203 assigned to the device 102, the beacon data 200 is configured to cryptographically protect or conceal the address 203. The address 203, in various embodiments, may be an email address of the device 102, or alternatively, it may comprise only a portion of the email address assigned to the device 102.

Referring back to FIG. 1, the clients 104A-B may be configured to monitor the local area network 108 for the beacon data 200 broadcast from the device 102. In other embodiments, the clients 104A-B may actively request the beacon data 200 from the device 102 via a beacon query. Upon receipt of the beacon data 200, the clients 104A-B may transmit the beacon data 200 to the service provider 106 via network 110. In response, the service provider 106 may transmit the address of the device 102 to the respective client 104A-B if, for example, the service provider 106 determines the beacon data 200 was generated by the device 102.

Determining that the beacon data 200 was generated by the device 102 provides a measure of security. For example, because the beacon data 200 is broadcast over a local area network 108, a service provider 106 that receives the beacon data 200 from a client 104A, via network 110, may assume that the client 104A was on the local area network 108 in the past, and consequently, is likely an authorized device. In other words, knowledge by the service provider 106 that the client 104A was in the vicinity of the device 102 indicates that the client 104A has access to the device 102.

In another embodiment, the clients 104A-B may go through one or more registration processes with the service provider 106. During the registration, the service provider 106 may provide the registering clients 104A-B with one or more credentials. The credentials may be provided based upon the client 104A-B verifying a valid email address. After receipt of the credentials, the clients 104A-B may utilize the credentials when communicating with the service provider 106. The credentials are associated with the email address of the clients 104A-B and enable the service provider 106 to track actions of the clients 104A-B. In various embodiments the credentials may include a token and a secret pair generated utilizing an open authorization ("OAuth") protocol.

In the embodiment, after the clients 104A-B receive their credentials and the beacon data 200 broadcast by the device 102, the clients 104A-B may transmit the beacon data 200 and their credentials to the service provider 106. The service provider 106 may then determine that the clients 104A-B are verified users; and that the beacon data 200 was generated by the device 102. In response to verification of the client credentials and the beacon data 200, the service provider 106 may transmit the address of the device 102 to the clients 104A-B.

In various embodiments, after receipt of the address of the device 102, the client 104A may then begin to transmit data or instructions to the device 102 via the address. The clients 104A-B may utilize the application 112 to transmit the data, wherein the application 112 includes a stored copy of the email address associated with the device 102. The stored copy of the address 102 may negate the need for the clients 104A-B to manually enter the address.

Referring to FIG. 3, an embodiment of a device 102 is illustrated in accordance with the present disclosure. The device 102 includes a network interface 302 configured to communicate over one or more networks, for example first network 110 and second network 108, a cryptography module 304, and a user interface 310. Other elements may also be included without deviating from the scope of the disclosure, dependent upon, for example, the function of the device 102.

In various embodiments, the cryptography module 304 is configured to generate a device signature 204 based on an address of the device 102 and an identifier of the device 102. The device signature 204, while based, at least in part, on the address 203 of the device 102, cryptographically protects the address 203. Consequently, a client 104A in possession of the device signature 204 is unable to determine the address 203. In one embodiment, the cryptography module 304 generates the device signature 204 utilizing a one-way hash of the identifier 202 and the address 203. Other cryptographic processes to protect the address 203 are contemplated.

In various embodiments, the network interface 302 may be coupled to the cryptography module 304. The network interface 302 may include hardware components such as, but not limited to, one or more antennas configured to transmit and receive signals, processors configured to process data and instructions, and memory. The network interface 302 may be configured to transmit and receive signals over a plurality of networks. For example, the network interface 302 may be configured to communicate with a service provider 106 via a first network 110, such as the Internet, and configured to communicate with client 104A-B over a second network 108, such as a local area network.

In various embodiments, the device 102 may further include a user interface 310. The user interface 310 may include menus configured to enable a user to interact with the device 102. In one embodiment, the user interface 310 includes a prompt configured to transition the device 102 into a beaconing mode. The prompt may be an option in a menu or alternatively, a single button disposed on the housing of the device 102. The prompt itself may transition the device 102 into a beaconing mode, or alternatively may trigger the need for additional input from a user, for example, a user name and a password. Once the device 102 has received the prompt, it may begin to broadcast beacon data 200 over the second network 108. In various other embodiments, the device 102 may transmit the beacon data 200 without receiving a prompt.

In a beaconing mode, the device 102 may continuously broadcast the beacon data 200 over a local area network 108 for a beacon period. The beacon period may be a predetermined amount of time. In various embodiments, the beacon period may be less than a minute. The prompt and the short duration of the beacon period may provide security for the beacon data 200 as it ensures a user has local access to the device 102. In addition, should more than one device 102 be on local area network 108, the short duration of the beacon period enables a client 104A to narrow the choices for association as only a small number of devices 102 are likely to be in a beaconing mode at a given point in time.

With reference to FIG. 4, a flow chart associated with a device 102 is illustrated in accordance with an embodiment. The flow chart 400 may begin at 402 and progress to 404 where the device 102, for example the device illustrated and discussed with reference to FIGS. 1 and 3, receives an identifier and an address. In the embodiment, the device 102 receives the identifier and an email address from the service provider 106. The service provider 106 assigns and associates the identifier and the email address with the device 102 during a registration process.

Based on the received identifier and address, the device 102, via a cryptography module 304, generates beacon data 200 at 406. The cryptography module 304 generates the device signature 204 with the identifier 202 and the address 203. The device signature may be generated as a hash of the identifier 202 and the address 203. In an alternative embodiment, the cryptography module 304 may generate the device signature using only a portion of the address. The device 102 may then generate the beacon data 200 using the identifier 202 and the generated device signature 204.

At 408, the device 102 receives a prompt from a user. A prompt, in various embodiments ensures that a user has physical access to the device 102. The prompt may be the pressing of a beacon button, or alternatively, may include the selection of a button or menu from a user interface 310 associated with the device 102. In other embodiments, a prompt may not be needed prior to transmission of the beacon data.

After receipt of the prompt 408, the device 102 may transition into the beaconing mode at 410. In the beaconing mode, the device 102 may continuously broadcast the generated beacon data 200 over the local area network. In one embodiment, the beaconing mode may include transmitting the beacon data 200 wirelessly over a local area network. After each broadcast, or alternatively after a determined number of broadcasts, the device 102 may determine whether or not the beacon period has elapsed at 412. If the beacon period has not elapsed, the device 102 may continue broadcasting the beacon data 200. Alternatively, if the beacon period has elapsed, the method may end at 414. Ending the method at 414, in various embodiments, may include monitoring for the next prompt.

Figure 5:
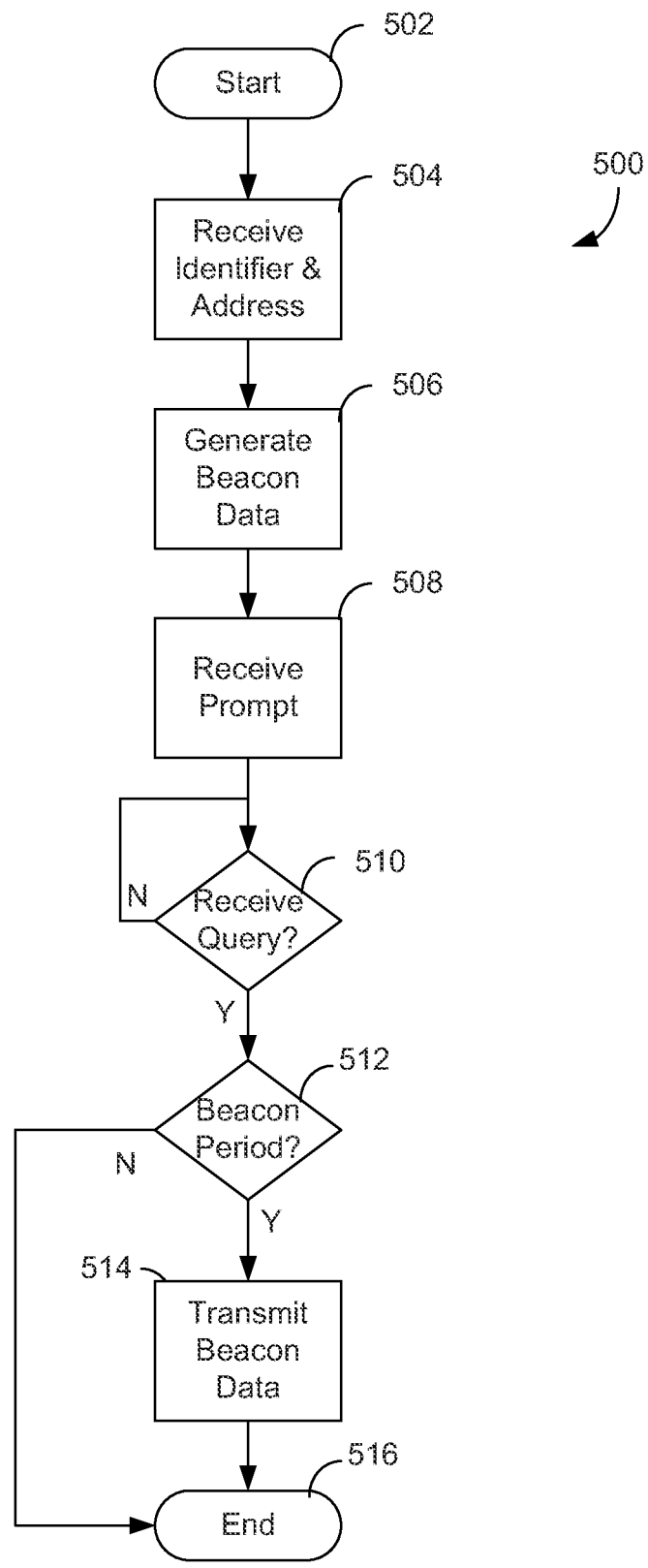

Referring to FIG. 5, another embodiment of a method associated with the device 102 is illustrated. The method 500 may begin at 502 and progress to 504 where, similar to the previous embodiment, the device 102 receives an identifier and an address. The identifier and the address may have been assigned during a registration process between the service provider 106 and the device 102.

At 506, based on the received identifier and address, the device 102, via a cryptography module 304, generates beacon data 200. The cryptography module 304 generates the device signature 204 with the identifier 202 and the address 203. The device signature 204 may be generated as a hash of the identifier 202 and the address 203. In an alternative embodiment, the cryptography module 304 may generate the device signature 204 using the identifier and a portion of the address.

After generating of the beacon data 200, the device 102 may wait for receipt of a prompt at 508. The prompt may be in the form of a depressed button or a menu selection, the menu being accessed through a user interface 310.

After receipt of the prompt at 508, the device 102 may monitor for a beacon query from a client 104A-B at 510. In various embodiments, the beacon query may include a request for beacon data 200. If a beacon query is not received at 510, the device 102 may either continue monitoring for a beacon query as shown, or alternatively, end monitoring after a predetermined amount of time. If a query is received, the device 102 may then determine whether it was received within the beacon period at 512. If the beacon query was received within the beacon period, the device 102 may transmit the beacon data 200 to the requesting client 104A at 514, and then the method may end at 516. Alternatively, if a beacon query is received outside of the beacon period, the device 102 may withhold transmission of the beacon data 200 and the method may end at 516. Ending of the method at 516 may include returning to 508 and again monitoring for receipt of a prompt.

Figure 6:
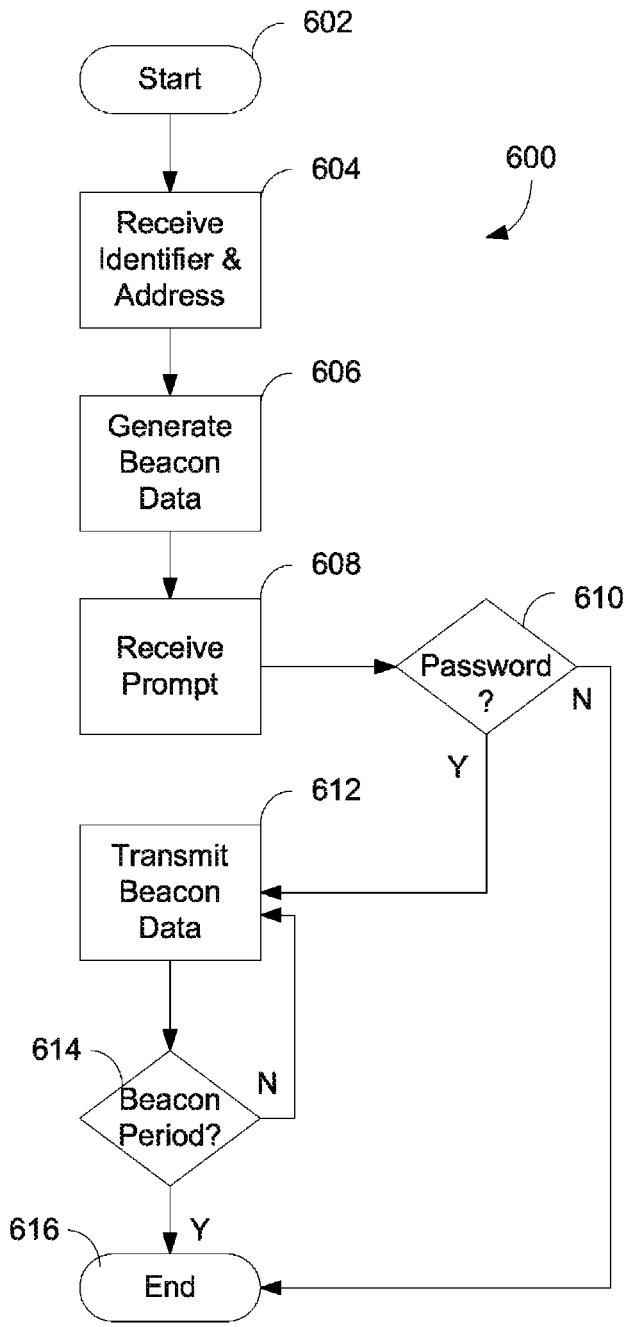

Referring to FIG. 6, another embodiment of a method associated with the device 102 is illustrated. The method 600 may begin at 602 and progress to 604 where, similar to the previous two embodiments, the device 102 receives an identifier and an address. The identifier and the address may have been assigned during a registration process between the service provider 106 and the device 102.

At 606, based on the received identifier and address, the device 102, via a cryptography module 304, generates beacon data 200. The cryptography module 304 generates the device signature 204 with the identifier 202 and the address 203. The device signature 204 may be generated as a hash of the identifier 202 and the address 203. In an alternative embodiment, the cryptography module 304 may generate the device signature 204 using the identifier and a portion of the address.

After generating the beacon data 200, the device 102 may wait for receipt of a prompt at 608. The prompt may be in the form of a depressed button or a menu selection, the menu being accessed through a user interface 310. Upon receipt of a prompt, the device 102 may request a user enter a username and/or password at 610. If a correct username and password are entered, the device 102 may transition into the beaconing mode at 612. In the beaconing mode, the device 102 may continuously broadcast the generated beacon data 200 over the local area network 108. In one embodiment, the beaconing mode may include transmitting the beacon data 200 wirelessly over a local area network. After each broadcast, or alternatively after a determined number of broadcasts, the device 102 may determine whether or not the beacon period has elapsed at 614. If the beacon period has not elapsed, the device 102 may continue broadcasting the beacon data 200. Alternatively, if the beacon period has elapsed, the method may end at 616. Ending the method at 616, in various embodiments, may include returning to 608 to monitor for the next prompt.

Returning to 610, if a username and a password are not correctly entered in response to the device 102 requesting the information, the device 102 may end the method at 616 without transmitting the beacon data 200. Consequently, correct entry and verification of the username and password may be a condition precedent to the transmission of the beacon data 200.

Figure 7:
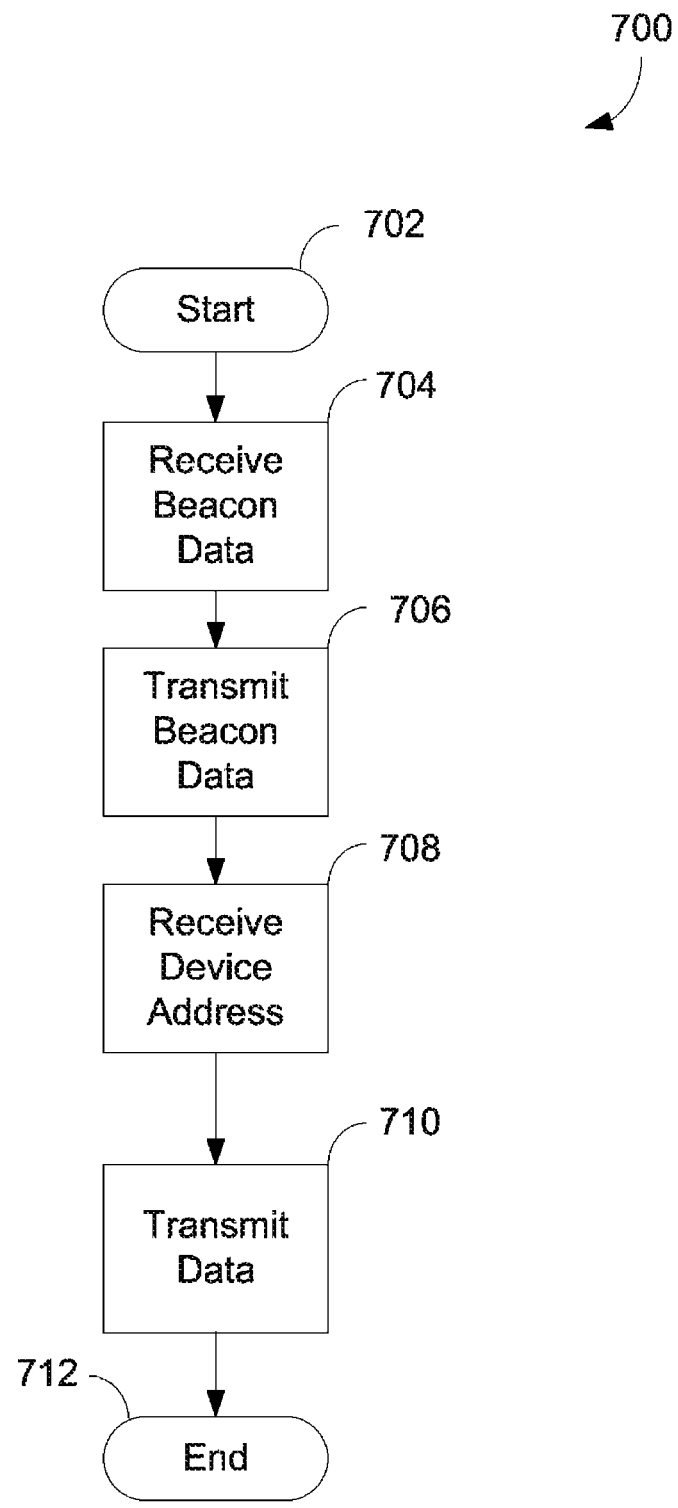

Referring to FIG. 7, a flow diagram associated with a client 104A-B is illustrated in accordance with various embodiments. The method 700 may include one or more program steps that are executed within the application 112 of the client 104A-B. In one embodiment, the method 700 may begin at block 702 by a user initiating a beacon mode on the device 102. The initiation may include pressing a button on a user interface, entering a username and a password, or some other type of initiation in which the user is within a physical access distance of the device 102.

At 704, the client 104A receives beacon data 200 from a device 102 over a local area network 108. The beacon data 200 may include the identifier 202 of the device 102 and a device signature 204. The device signature 204 may be based on and cryptographically protect an address 203 of the device 102. For example, the device signature may be a hash of the identifier 202 and the address 203. Consequently, the client 104A may be unable to determine the address of the device 102 based on the beacon data 200.

At 706, the client 104A may transmit the beacon data 200 to the service provider 106 over, for example, the internet. The service provider 106 may then look up the device address based on the received identifier and perform one or more processes or comparisons. Based on the results of the comparison, the service provider 106 may transmit the address of the device 102 to the client 104A at 708. After receiving the address of the device 102, the client 104A may transmit data directly to the device 102, at 710. The method may then end at 712.

Figure 8:
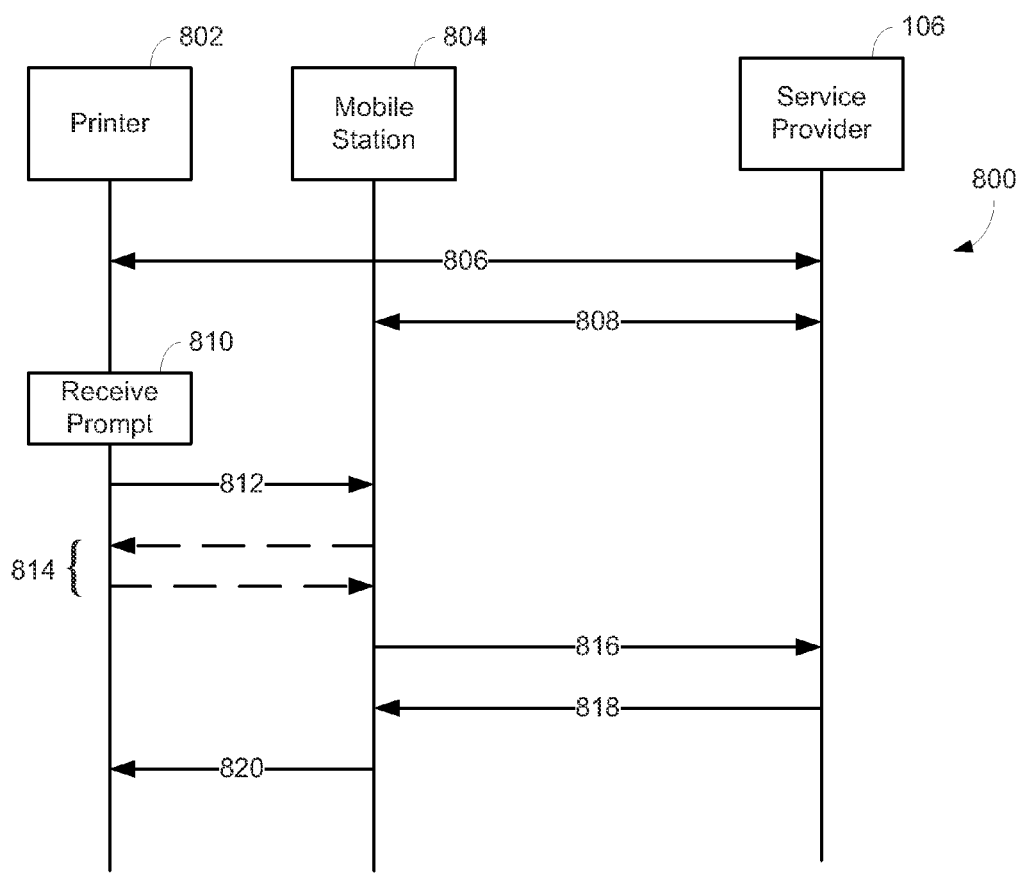
FIG. 8 illustrates a signal diagram in accordance with various embodiments of the present disclosure.

Referring to FIG. 8, a signal diagram 800 is illustrated in accordance with various embodiments. The signal diagram 800 illustrates various embodiments of interactive signaling that may occur between the various entities previously described. In the illustrated embodiment, the signal diagram includes communication transmitted between a printer 802, a mobile station 804, and a service provider 106.

Initially, the printer 802 registers with the service provider 106 via a registration process 806. During the registration process 806, the service provider 106 assigns and provides an identifier 202 and an email address to the printer 802. In a similar manner, the mobile station 804 may also register 808 with the service provider 106. During this registration process 808, the mobile station 804 may receive credentials that enable the mobile station 804 to interact with the service provider 106. In various embodiments, the credentials may include a token and a secret pair that identifies the mobile station 804.

In the embodiment, the address of the printer 802 is lengthy and includes random characters. To securely pair the mobile station 804 with the printer 802, the mobile station 804 may be brought into a local area network (not illustrated) associated with the printer 802. While in the local area network, a user of the mobile station 804 may prompt 810 the printer 802 to transition to a beaconing mode. In various embodiments, the prompt 810 may begin a beacon period during which the printer 802 may broadcast 812 its beacon data. Alternatively, in another embodiment, the printer 802 may receive a beacon query and subsequently transmit the beacon data, via the signaling associated with 814. In various embodiments, the printer 810 may generate the beacon data either before or after receiving the prompt 810.

After receipt of the beacon data, the mobile station 804 remains unable to determine the address of the print address because the beacon data cryptographically protects the address of the printer 802. To receive the address of the printer 802, the mobile station 804 transmits 816 the beacon data to the service provider 106 via a network, such as the internet (not illustrated). In various embodiments, the mobile station 804 may also transmit its credentials received during the registration process. The credentials enable the service provider 106 to ensure that the mobile station 804 is a valid user.

The service provider 106 may perform various functions with the beacon data. In one embodiment, the service provider 106 may compare the beacon data with data locally stored at the service provider 106. Based on a determination that the beacon data was generated by the device 102, the service provider 106 may exchange the address of the device 102 for the beacon data 200 transmitted by the clients 10A-B. In other words, based on a determination that the beacon data 200 has not been forged, the service provider 106 may transmit the address of the device 102 to the client 104A-B. This effectively negates the need for the mobile station 804 to manually enter the address. With the printer address, the mobile station 804 may then begin transmitting print data 820 to the printer 820.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method, comprising:
   receiving, by a device, an identifier and an address from a service provider via a first network;
   generating, by the device, a device signature based on the identifier and the address, wherein the device signature cryptographically protects the address;
   generating, by the device, beacon data comprising the identifier and the device signature, wherein the beacon data cryptographically protects the address; and
   transmitting, by the device, the beacon data comprising the identifier and the device signature over a second network to enable a client to associate with the device.

2. The method of claim 1, wherein generating the beacon data comprises generating a device signature configured to cryptographically protect the address; and
   wherein transmitting the beacon data comprises transmitting the identifier and the device signature.

3. The method of claim 2, wherein generating the device signature comprises generating the device signature with a hash function of the identifier and the address.

4. The method of claim 1, wherein transmitting the beacon data comprises transmitting the beacon data over a local area network.

5. The method of claim 1, further comprising:
   receiving, by the device, a prompt prior to transmitting the beacon data over the second network.

6. The method of claim 1, further comprising:
   receiving, by the device, print data from the client, wherein the device is configured to output the print data via a print module.

7. The method of claim 1, wherein transmitting the beacon data comprises transmitting the beacon data for a beacon period, wherein the beacon period includes a predetermined amount of time.

8. The method of claim 1, further comprising:
   receiving, by the device, a beacon query from the client, wherein the beacon query includes a request for the beacon data.

9. A non-transitory computer readable medium having a plurality of programming instructions stored thereon, wherein the plurality of programming instructions, if executed, cause a processor of a client to perform operations comprising:
   receiving beacon data from a device, wherein the beacon data includes an identifier and a device signature of the device, the device signature cryptographically protecting an address of the device;
   transmitting the beacon data to a service provider associated with the device; and
   receiving the address of the device based on a determination by the service provider that the beacon data was generated by the device, wherein the address enables the client to associate with the device.

10. The non-transitory computer readable medium of claim 9, wherein the plurality of programming instructions, if executed, cause the processor of the client to perform operations further comprising:
    transmitting a client credential to the service provider, wherein the client received the client credential from the service provider during a registration process.

11. The non-transitory computer readable medium of claim 9, wherein the plurality of programming instructions, if executed, cause the processor or the client to perform operations farther comprising:

transmitting print data to the device via the received address.

12. The non-transitory computer readable medium of claim 9, wherein the plurality of programming instructions, if executed, cause the processor of the client to perform operations further comprising:
transmitting a beacon query to the device, wherein the beacon query includes a request for the beacon data.

13. The non-transitory computer readable medium of claim 9, wherein the device signature comprises a hash function of the device identifier and the address.

14. An apparatus, comprising:
a cryptography module configured to generate a device signature based on an address and an identifier, and beacon data based on the identifier and the device signature wherein the address and the identifier are assigned by a service provider and the beacon data cryptographically protects the address; and
a network interface coupled to the cryptography module, wherein the network interface is configured to broadcast the beacon data comprising the device signature and the identifier to enable a client to associate with the apparatus.

15. The apparatus of claim 14, wherein the cryptography module is configured to generate the device signature with a hash function of the identifier and the address.

16. The apparatus of claim 14, wherein the network interface is configured to broadcast the device signature and the identifier over a local area network.

17. The apparatus of claim 14, wherein the network interface is configured to receive the address and the identifier from the service provider over a wide area network.

18. The apparatus of claim 14, wherein the network interface is configured to broadcast the device signature and the identifier in response to receipt of a prompt.

19. The apparatus of claim 14, wherein the network interface is configured to broadcast the device signature and the identifier for a beacon period, wherein the beacon period has a predetermined duration.

20. The apparatus of claim 14, further comprising:
a print module configured output print data on media; and
a controller coupled to the print module, the controller configured to control the print module to put the print data.

* * * * *

UNITED STATES PATENT AND TRADEMARK OFFICE
CERTIFICATE OF CORRECTION

PATENT NO. : 8,453,220 B2
APPLICATION NO. : 12/971693
DATED : May 28, 2013
INVENTOR(S) : Laurent Pizot et al.

It is certified that error appears in the above-identified patent and that said Letters Patent is hereby corrected as shown below:

In the Claims:

In column 8, line 66, in Claim 11, delete "or the" and insert -- of the --, therefor.

In column 8, line 67, in Claim 11, delete "farther" and insert -- further --, therefor.

Signed and Sealed this
Twentieth Day of August, 2013

Teresa Stanek Rea
*Acting Director of the United States Patent and Trademark Office*